(12) United States Patent
Jones

(10) Patent No.: US 6,851,615 B2
(45) Date of Patent: Feb. 8, 2005

(54) METHOD OF INDIVIDUALLY TRACKING AND IDENTIFYING A DRUG DELIVERY DEVICE

(75) Inventor: William Neil Jones, Miami, FL (US)

(73) Assignee: Noven Pharmaceuticals, Inc., Miami, FL (US)

( * ) Notice: Subject to any disclaimer, the term of this patent is extended or adjusted under 35 U.S.C. 154(b) by 0 days.

(21) Appl. No.: 10/348,242

(22) Filed: Jan. 21, 2003

(65) Prior Publication Data

US 2003/0127508 A1 Jul. 10, 2003

Related U.S. Application Data

(63) Continuation of application No. 09/720,004, filed as application No. PCT/US99/16042 on Jul. 14, 1999, now abandoned, which is a continuation of application No. 09/119,021, filed on Jul. 20, 1998, now abandoned.

(51) Int. Cl.[7] .............................................. G06K 19/00
(52) U.S. Cl. ................... 235/487; 235/462.13
(58) Field of Search ........................... 235/462.13, 487; 600/362, 573, 575, 363, 304, 584, 366, 346; 604/312

(56) References Cited

U.S. PATENT DOCUMENTS 5,899,856 A * 5/1999 Schoendorfer et al. ..... 600/362

6,080,421 A 6/2000 Steinborn et al.

FOREIGN PATENT DOCUMENTS

| AU | 9893387 | 4/1998 |
| EP | 0114125 | 7/1984 |
| JP | 08000712 | 1/1996 |

* cited by examiner

*Primary Examiner*—Karl D. Frech
(74) *Attorney, Agent, or Firm*—Jay G. Kolman; Scott M. Oldham

(57) ABSTRACT

A method of and system for identifying an individual drug delivery device and tracing its ownership. An individual drug delivery device, such as a patch, is coded with a unique identifier. Such coding is performed by using a bar code or by storing the identifier in a memory device in the drug delivery device. A database contains a record of the identifier, representing the drug delivery device. The identifier is read upon a transfer of the drug delivery device and the database is updated to include information such as the date of the transfer, the identity of the transferee and the prescribing physician. The ability to retrieve such information regarding specific drug delivery devices can result in the prevention of abuse of controlled substances contained therein.

22 Claims, 3 Drawing Sheets

| 980704123456 | 31 |
| methylphenidate - 20mg | 32 |
| ABC Manufacturing Co. | 33 |
| 980720 | 34 |
| XYZ Distribution Inc. | 35 |
| 980727 | 36 |
| Joe Pharmacist | 37 |
| 980803 | 38 |
| Jane D. Patient | 39 |

METHOD OF INDIVIDUALLY TRACKING AND IDENTIFYING A DRUG DELIVERY DEVICE

This application is a continuation of Ser. No. 09/720,004 filed on Dec. 18, 2000 now abandoned, which is a 371 of Ser. No. PCT/US99/16042 filed on Jul. 14, 1999 which is a continuation of Ser. No. 09/119,021 Jul. 20, 1998 now abandoned.

BACKGROUND OF THE INVENTION

The invention relates generally to drug delivery devices. Specifically, the present invention relates to the tracking and identification of an individual prescription drug delivery device, such as an adhesive patch, and involves encoding the drug delivery device with pertinent information.

While there is no limitation on the type of drug that can be used with the present invention, the invention has particular applicability for "controlled substances" such as those listed in the regulations promulgated pursuant to the Food, Drug and cosmetic Act, 21 C.F.R. §§ 1308 et seq., and include substances having a stimulant or depressant effect on the central nervous system. Because stimulant drugs have a high potential for abuse, the U.S. Drug Enforcement Administration (DEA) has placed stringent controls on their manufacture, distribution and prescription. For example, the DEA requires special licenses for these activities.

One such prescription stimulant drug is methylphenidate (MPH). MPH, manufactured and sold by Novartis Pharmaceuticals Corporation (formerly Ciba-Geigy) under the brand name Ritalin®, is used in the treatment of attention deficit and/or hyperactivity disorders in both children and adults. Experts estimate that such disorders affect 3.5 million children and 17 million adults—and perhaps even as much as 10 percent of the American population. MPH helps individuals suffering from such disorders stay calm and focused, and often improves their behavior, grades and even their self esteem. About 1.5 million school-age youngsters have been prescribed MPH in mid-1995, with more recent estimates climbing to about 2.4 million.

However, use for illicit, non-medicinal purposes is being increasingly reported particularly among college and high school students. In 1994, a national high school survey (Monitoring the Future) indicated that non-prescription use of MPH doubled among high school seniors between 1993 and 1994, resulting in more seniors abusing MPH than are actually prescribed it legitimately. Similar to cocaine or amphetamines in the nature and duration of their effects, abusers are crushing Ritalin® tablets into powder which they then snort to get a quick high.

Diversion or abuse of MPH is not however limited to students. Diverse segments of the population from health care professions to street addicts have also been implicated. Organized drug trafficking groups are using various schemes to obtain MPH for resale on the illicit market. According to the DEA, MPH ranks among the most frequently reported controlled pharmaceuticals stolen from licensed handlers.

Law enforcement and other authorities confiscate prescription drugs and specifically, controlled substances, from unauthorized users or unlicensed handlers. It would be useful, to be able to identify the specific product, such as the individual drug delivery device, and be able to trace the origin of that specific product to determine the identity of the last licensed handler of the product, the prescribing physician, pharmacy or patient, etc. Currently, there is no way to identify the ownership or trace the origin of a prescription drug once it is removed from the prescription packaging.

The art has recognized the need for improving record keeping and inventory management in dispensing drugs, and various methods have (been employed by health care suppliers that include drug dispensing machines. US, WO 98/28676 disclosed a method for drug information management that utilizes a drug dispensing machine in combination with a computerized drug management software system. The method provides for removing the original drug packaging, and re-packaging the drug into a container that is then marked in order to identify information regarding or relating to the repackaged contents. The new container containing the one or more repackaged drugs is then dispensed from an automated machine which is in electronic communication with a computer in order to track drug use and need for replacement.

Presumably, if a legitimate handler believes that the individual prescription drugs it dispenses can be traced back to him or her, the handler will be less inclined to distribute the drug illegally and will take greater precautions against loss or theft. The criminal penalties for illegal distribution and use of controlled substances are severe. Thus, providing authorities with a system for accurately identifying the last known legitimate handler of or other pertinent information regarding a particular prescription drug product would help to reduce the potential for abuse and illegal distribution of the product. It would also make available more of the supply of the drug for use by legitimate users with a medical need.

Placing the drug in a delivery system that can control the release rate of the drug in the body or to a site of application, such as an adhesive patch, can help to reduce the potential for abuse of the drug over other conventional dosage administration forms. Nevertheless, the potential for abuse and misuse still exists even with the use of such patches.

SUMMARY OF THE INVENTION

Having recognized the above described problem and need, the inventors have developed the following solution, which is embodied in the present invention. The invention is a system for identifying an individual drug delivery device and tracing its ownership. It will be apparent to one skilled in the art that the invention has applicability with a variety of drug delivery devices, forms and drugs.

In one embodiment of the invention, an individual drug delivery device is encoded with a unique identifier, usually during or soon after its manufacture. In addition to reducing the potential for abuse of the drug through insufflation or injection, the use of a drug delivery device such as an adhesive patch facilitates such coding of individual products. The identifier may be a visible marking such as an alphanumeric string or a bar code and is indelibly printed onto the drug delivery device. In the case of a patch, the visible identifier may be printed onto the backing of the patch. Such an identifier may be recognizable by a human or by an electronic and/or optical device, such as a scanner.

Once the unique identifier has been placed on or in the drug delivery device, a corresponding identifier is created in a database. Information corresponding to each drug delivery device is added to the database as the devices are distributed. At each level of distribution, the individual device identifiers can be scanned, causing relevant information, such as the name of the handler and the date, to be transmitted and appended to the database at a location corresponding to the device identifier. Usually, more than one drug delivery device is transferred between handlers; accordingly, the packaging of the devices, such as a box, will contain a separate identifier corresponding to the devices contained therein. In those cases, the box identifier is scanned causing the data corresponding to multiple device identifiers in the database to be updated with the same handler information. Ultimately, when a drug prescription is filled by the last handler, the individual devices given to the user are scanned causing the database to be updated with information regarding the end-user to whom the individual device was dispensed. Database updates can be performed immediately upon scanning or at some later time.

Under the present invention, authorities have the ability to accurately identify and trace the ownership of any of the drug delivery devices found or confiscated from an unauthorized user. Using the unique identifier on or in an individual drug delivery device, authorities can access the database and obtain information regarding the device such as the identities of: the person to whom the drug was dispensed, the pharmacy or other handler that dispensed the drug and any preceding handlers, such as distributors, of the device. Also, the obtained information can include the date when the device came into the possession of each of the handling parties listed.

Using this information, authorities are better able to investigate and reduce the occurrence of illegal distribution or theft of the drug delivery devices, which, as discussed, can contain controlled substances such as MPH. In addition, knowledge that such information is available to authorities will serve to diminish any inclination a handler may have to distribute the drug illegally. It will also encourage all handlers to take greater precautions against loss or theft or the drug delivery devices. Furthermore, the reduction of abuse and illegal distribution of the controlled substance contained in the drug delivery device will make available more of the supply of the drug for use by legitimate users with a medical need.

In an alternative embodiment of the present invention, the drug delivery device comprises a memory device such as a microchip or Radio Frequency Identification (RFID) tag instead of visible markings. In a patch, the microchip or RFID tag can be disposed on or in the backing layer of the patch. The memory device serves to uniquely identify the drug delivery device. All pertinent information regarding the delivery device, such as the identities of the handlers and the legitimate user as well as the prescribing physician, can be stored in the microchip or RFID tag itself. Upon recovery of such a drug delivery device, authorities can, with the assistance of a microchip or RFID reader, extract the information from the microchip or RFID tag contained in the delivery device. A database may be used to provide additional information regarding the specific drug delivery devices, or in the situation where the memory device is a read only memory device. The availability of this information with or without the use of a database has the same beneficial effect in reducing abuse, illegal distribution and theft as does the above described embodiment of the present invention.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein.

Figure 1:
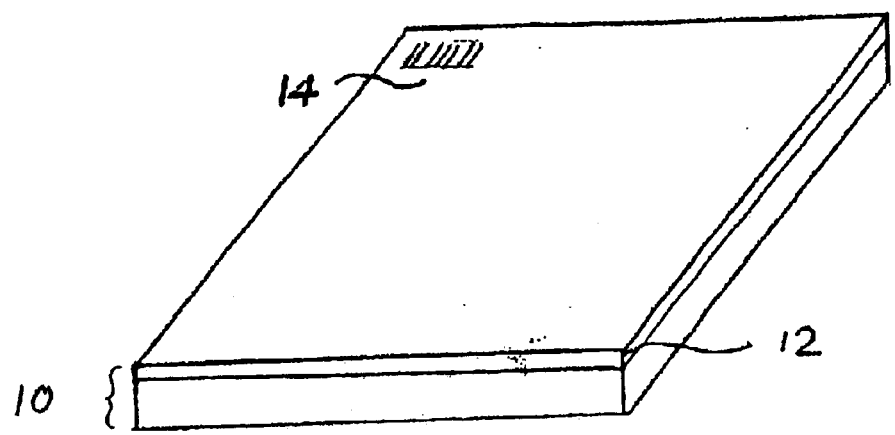
FIG. 1 illustrates a uniquely identifiable drug delivery device according to the present invention, shown as a patch, upon which a bar code identifier is placed.

DETAILED DESCRIPTION OF THE
PREFERRED EMBODIMENTS

As described herein with reference to the accompanying drawings, the present invention provides a method and system for identifying and tracing the ownership of an individual drug delivery device. This allows authorities to investigate more effectively any illegal distribution or theft of drug delivery devices, specifically those devices containing controlled substances. It also has the effect of reducing abuse and making available more of the supply of the controlled substance for use by legitimate users.

While the descriptions herein primarily refer to the identification of a patch for delivering a controlled substance such as MPH, it will be apparent to one skilled in the art that the invention has applicability to other drug delivery devices and drugs. Accordingly, as used herein, the term "drug delivery device" shall further include aerosol canisters such as those used for inhalation therapy, pre-filled syringes, IV bags, bottles, ampules, tamper-proof packaging and any unitdose drug packaging.

The term "drug" as used herein is intended to have the broadest meaning and includes at least one of any therapeutic, prophylactic, pharmacological or physiological active substance, or mixture thereof, which is delivered to a mammal to produce a desired, usually beneficial, effect. More specifically, any agent which is capable of producing a pharmacological response, localized or systemic, irrespective of whether therapeutic, diagnostic or prophylactic in nature, is within the contemplation for use with the invention. It should be noted that the agents or drugs may be used singularly or as a mixture of two or more agents or drugs, and in amounts sufficient to prevent, cure, diagnose, mitigate or treat a disease or condition, as the case may be. The invention has particular applicability for substances which have or can create an addictive, habit-forming or dependency effect or withdrawal symptoms upon cessation of usage. It is also applicable for use with substances which are or may be lethal, toxic or may cause serious adverse physiological effects if taken or administered in too great a dose or quantity, such as anabolic steroids and hormonal substances such as testosterone and substances having a stimulant or depressant effect on the central nervous system.

In a first embodiment of the present invention, an individual drug delivery device is encoded with a unique identifier, usually soon after its manufacture or as one of the final steps in its manufacture. The identifier allows a particular device to be differentiated from all others. Typical drug delivery devices facilitating such coding are patches. As used herein the term "patch" refers to any drug containing device, system, composition, bandage, plaster, and the like, that is affixed to the skin or mucosa of a subject for systemic or local administration of the drug. Such devices for transdermal application are, for example, described in references such as U.S. Pat. Nos. 4,994,267 and 5,474,783, both assigned to Noven Pharmaceuticals, Inc., which are incorporated herein by reference. Exemplary devices for transmucosal application are described in U.S. Pat. No. 5,446,070 assigned to Noven Pharmaceuticals, Inc., which is incorporated herein by reference. Such devices typically have a "backing" which facilitates encoding by printing or labeling. Suitable materials that can be used, singularly, in combination, as laminates or as coextrusions, to form the backing are well known in the art and include films or sheets of polyethylene, polyester, polypropylene, polyurethane, polyolefin, polyvinyl alcohol, polyvinly chloride, polyvinylidene, polyamide, vinyl acetate resins, BAREX®, ethylene/vinyl acetate copolymers, ethylene/ethylacrylate copolymers, metal-vapor deposited films or sheets thereof, rubber sheets or films, expanded synthetic resin sheets or foils and papers.

Figure 2:
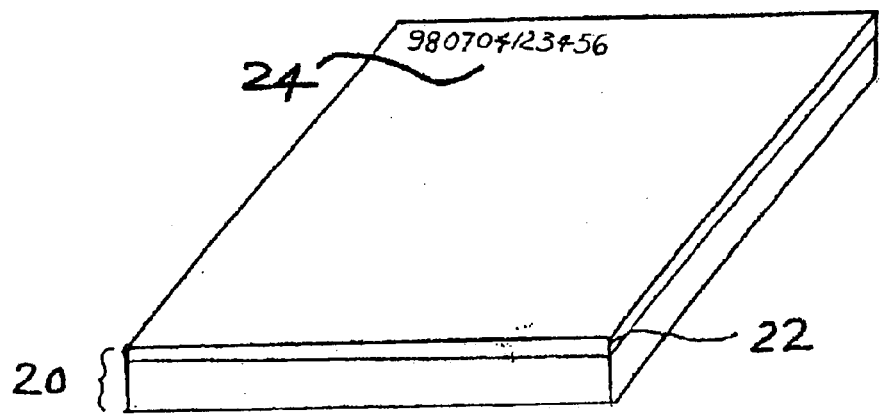
FIG. 2 illustrates a uniquely identifiable drug delivery device according to the present invention, shown as a patch, upon which an alphanumeric string identifier is placed.

Various types of coding can be used under the present invention. Two examples are bar codes and alphanumeric strings. Referring now to the drawings, it should be noted that the figures are illustrative in nature and are not drawn to scale. FIG. 1 shows a patch 10 as the drug delivery device on which is placed a bar code 14 to uniquely identify the device. The bar code 14 can be printed on any area of the backing 12 of the patch 10. FIG. 2 shows a patch 20 as the drug delivery device, similar to that of FIG. 1, but where an alphanumeric string 24 is placed on backing 22 to uniquely identify the device. The alphanumeric string 24 can be a serial number or other string of characters of any length. By its nature, the alphanumeric string is more easily discernable by a person than is the bar code. Both types of codes, however, are readable by known electronic scanning devices. It is intended that other variations on the type of coding fall within the scope of this invention.

Preferably, the printing of a code is performed with waterproof, indelible ink such that the code cannot be removed without destroying the patch itself. Alternatively, the coding can be incorporated into the drug-delivery device during production. For example, bar coding and alphanumeric strings can be printed on the underside of the backing layer 12 and 22 so that the coding cannot not be altered or removed by solvent. The patch would effectively have to be destroyed to tamper with the coding. Yet, the coding could be read through the backing layer 12 and 22.

According to the present invention, once a drug delivery device, such as a patch, has been encoded with an identifier, a corresponding identifier is placed into a database. While this can be accomplished at any time, placing an entry into a database corresponding to the actual device is preferably done by the manufacturer promptly upon manufacture of the device. The database itself preferably resides with the manufacturer but can be located anywhere. In addition to the identifier, the entry made into the database can include such information as the name and quantity of the drug contained in the device, the date of manufacture, and the place of manufacture.

The device is then packaged for sale and distribution. Individually packaged patches can include an additional identifier on the packaging material itself. Furthermore, as multiple drug delivery devices are often packaged and distributed in sets, boxes containing such sets can be coded with an identifier representing and identifying the individually coded devices contained therein.

The present invention is not limited by the number of channels of distribution that may be in place with respect to any specific type of drug delivery device. Handlers of controlled substances must be licensed by the appropriate authorities, whether the handler is a bulk distributor of pharmaceutical products or a local pharmacist. When a particular device is transferred from one party to another, such as in a sale between two handlers, the identifier of the transferred device is recorded and the database is updated with information pertaining to the transfer. This recording of the device identifier, in the case of bar coding, can be done by an electronic scanning device. In the case of alphanumeric strings, the recording can be done electronically or by a person. The database is then updated with information such as the name of or code representing the identity of the transferee of the device, and the date of the transfer. In the case of multiple devices transferred in a prepackaged box, the identifier on the box is recorded. Upon transfer of the box identifier to the database, information pertaining to all of the individual devices contained in the box are updated accordingly. Similar updates to the database are made whenever possession or ownership of an individual device is transferred. The recording of information and the updating of the database should be accomplished at the time of transfer of possession.

Ultimately, when a drug prescription is filled by the last licensed handler for an end-user of the device, the information added to the database is, at minimum, the identity of the end-user to whom the device was transferred. Additional information added to the database can include the address of the patient, the RX#, the MD#, the identity of the prescribing physician, the DEA#, the pharmacy # and the date of dispensation or transfer.

Figure 3:
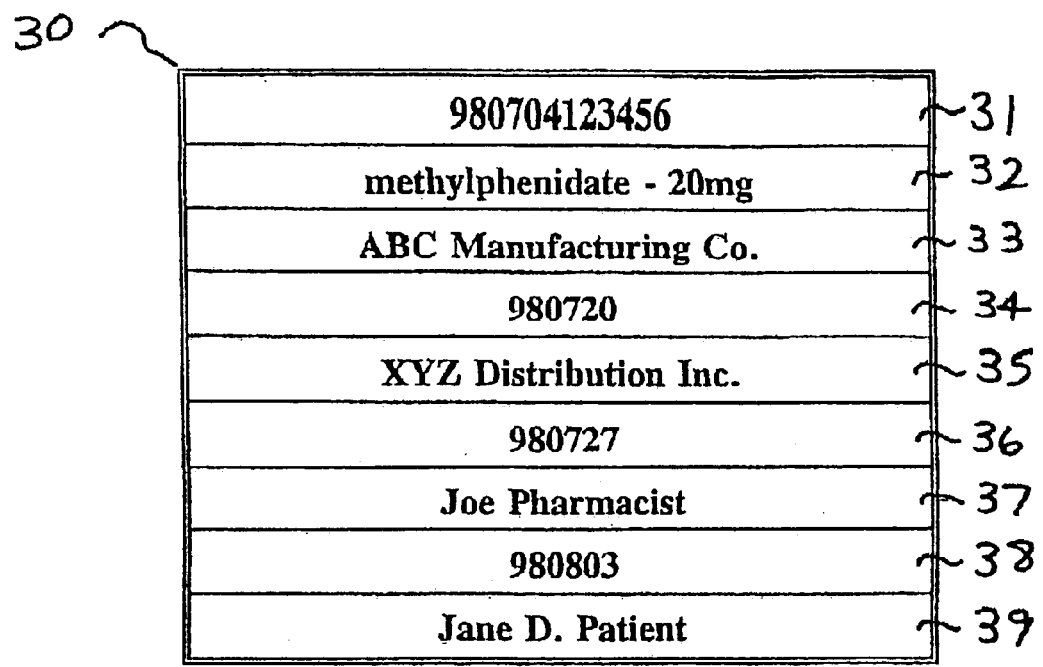
FIG. 3 illustrates the information stored in a database for a particular drug delivery device.

FIG. 3 illustrates a sample set of the information stored in the database for a particular drug delivery device. The data set 30 all corresponds to the individual drug delivery device coded with the identifier 31 "980704123456". This identifier represents the bar code symbol or is the alphanumeric string coded onto the actual device. The data set 30, as shown in FIG. 3, also contains the name and quantity of the drug contained in the device 32, "methylphenidate—20 mg". The manufacturer information 33, "ABC Manufacturing Co." is also included. The above describe data is usually entered into the database before the device is initially transferred from manufacturer. Next, the first date of transfer 34 "980720" is shown as is the transferee 35 "XYZ Distribution Inc." A subsequent transfer to a pharmacy is shown by the second date of transfer 36 "980727" and the transferee 37 "Joe Pharmacist". Finally, the last recorded transfer is shown by the third date of transfer 38 "980803" and the transferee "Jane D. Patient" who presumably is the end-user.

Police and other authorities often find or confiscate drug delivery devices containing controlled substances from unauthorized users and illegal distributors. So long as the database has been updated, under the present invention, authorities have the ability to accurately identify and trace the ownership of a particular drug delivery device. Using the unique identifier on the individual drug delivery device, authorities can access the database and obtain information regarding the device, such as the identities of: the person to whom the drug was dispensed, the pharmacy or other handler that dispensed the drug and any preceding handlers, such as distributors, of the device. Also, as discussed, the obtained information can include the date when the device came into the possession of each of the handling parties listed.

Using this information, authorities are better able to investigate and reduce the occurrence of illegal distribution or theft of the drug delivery devices, which, as discussed, can contain controlled substances such as MPH. For example, if the authorities were to confiscate from an unauthorized user the drug delivery device identified in FIG. 3, based on the code found on the device and by accessing the database, they would know immediately that the device was known to be in the possession of Jane D. Patient on Aug. 3, 1998. Such information would greatly assist in their investigation of the unauthorized sale or use of the controlled substance.

Furthermore, knowledge that such information is available to authorities will serve to diminish any inclination a handler may have to distribute the drug illegally. It will also encourage all handlers to take greater precautions against loss or theft or the drug delivery devices. An additional benefit of the present invention is that the reduction of abuse and illegal distribution of the controlled substance contained in the drug delivery device will make available more of the supply of the drug for use by legitimate users with a medical need.

Figure 4:
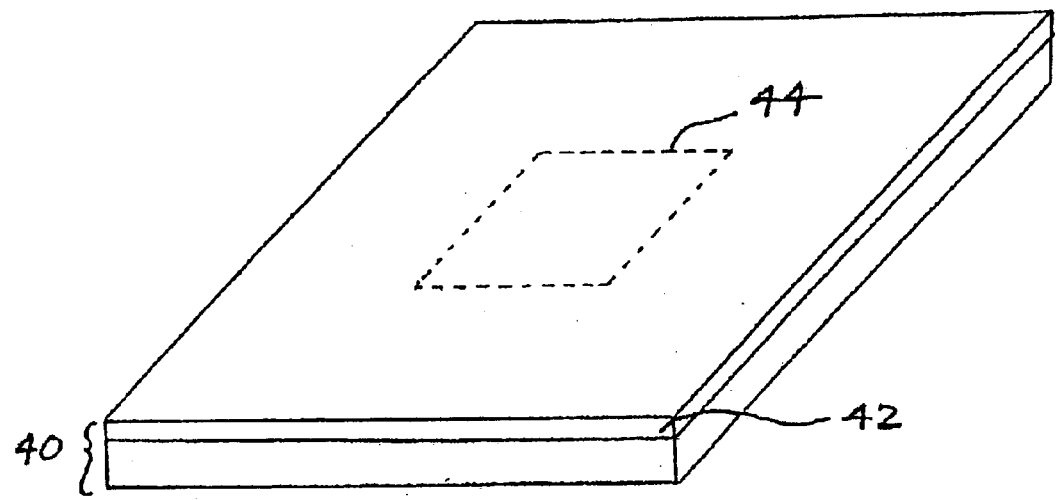
FIG. 4 illustrates a uniquely identifiable drug delivery device according to the present invention, shown as a patch, within which a memory device is disposed.

In an alternate embodiment of the present invention, the above described method of tracking is implemented with drug-delivery devices that include a programmable microchip or a radio frequency identification (RFID) tag. In the case of a patch, a microchip or an RFID tag can be incorporated into the backing layer during production of the patch. FIG. 4 illustrates a drug delivery device under the present invention, such as a patch 40, wherein a memory device 44, such as a microchip or RFID tag, is disposed within the backing layer 42. Alternatively, the programmable microchip or RFID tag is affixed onto the backing layer of the patch during later stages of the production process, before the device is pouched. Thin and flexible RFID tags are known in the art. Moskowitz et al., in U.S. Pat. No. 5,528,222, disclosed such an RFID tag having a semiconductor circuit with logic, memory, and a radio frequency circuit in a thin and flexible package for use with such items as credit cards, passports, admission tickets and postage stamps. Tuttle et al., in U.S. Pat. No. 5,448,110, disclosed an improved RFID system that includes, in combination, an integrated circuit by which information can decoded and be stored, and an RF antenna by which information can be received and transmitted.

Under the present invention, there are certain advantages to using microchips or RFID tags in drug delivery device over barcodes. For example, while a bar code indicates an identification number for a specific drug delivery device, a microchip or RFID tag allows for additional information to be stored with the drug delivery device, such as a physician #, a vendor #, etc. Unlike barcodes, information can be read, with a microchip or RFID reader, from the microchip or RFID tag on the patch while the patch is applied to the skin of the user and without removal of clothing. Also, RFID and microchip readers tend to be less expensive than bar code scanners.

It is envisioned that various types of RFID tags will be used in accordance with the present invention. The use of passive RFID tags, those which rely on power from an external reader, is preferred. It is also possible, however, to use active RFID tags, those which contain their own power supplies, providing they are sufficiently thin to be disposed on or in the drug delivery device. The various RFID tags contain differing memory capacities and operate in different frequency ranges. It will be apparent to one skilled in the art that the present invention is not limited by such factors.

It is intended that the invention, as described herein, include all variations and modifications as fall within the scope of the claims and equivalents thereof.

What is claimed is:

1. A method of identifying and tracking the dispensing of drug delivery devices comprising the steps of:
   providing at least one drug delivery devices, each having an amount of a drug or other agent for delivery to a user,
   coding each of the at least one drug delivery devices with a unique identifying code placed on or in the device;
   reading the code with an electronic or optical device; and
   creating a database and database record comprising the code corresponding to the drug delivery device in the database to allow identification of the user to whom the at least one drug delivery device was dispensed prior to use.

2. The method of claim 1, wherein the coding of the device is in a form of a bar code.

3. The method of claim 1, wherein the coding of the device is in a form of an alphanumeric string.

4. The method of claim 1, wherein the coding of the device is in a form of a microchip or a radio frequency identification tag.

5. The method of claim 1, wherein information corresponding to the code is added to the database upon a transfer of possession of the drug delivery device to update the information.

6. The me of claim 5, wherein the pharmacological active agent is a controlled substance.

7. The method of claim 1, wherein the information comprises at least one of the identity of a transferee in the transfer, the identity of a prescribing physician, the identity of a dispensing pharmacy, the date of the transfer, and the name and amount of a pharmacological active agent contained in the device.

8. The method of claim 1, wherein the drug delivery device is selected from the group consisting of a transdermal or transmucosal patch, a pre-filled syringe, an intravenous bag, a bottle, an ampoule, an aerosol canister utilized in inhalation therapy, a tamper-proof package, any unit-dose drug packaging and combinations thereof.

9. The method of clam 1, wherein the drug delivery device is a transdermal or transmucosal patch.

10. The method of claim 9, wherein the patch comprises a backing and said code is provided on an interior surface of said backing.

11. The method of claim 1, wherein a plurality of drug delivery devices are packaged in at least a first package, wherein said first package is coded with a unique identifying code which is incorporated into the database record corresponding to each of the devices contained therein.

12. The method of claim 11, wherein upon transfer of said first package, the database record relating to each of the devices contained therein is updated with at least the identity of the transferee.

13. The method of claim 1, wherein a drug delivery device is packaged in a unit dose package, wherein said unit package is coded with a unique identifying code, which is incorporated into the database records corresponding to the device contained therein.

14. The method of claim 13, wherein upon transfer of said unit dose package, the database record of the device contained therein is updated with at least the identity of the transferee.

15. The method of claim 1, wherein upon detection of a drug delivery device in the possession of an unauthorized user, the database is interrogated to determine the identity of the last transferee thereof.

16. A method of claim 1, wherein the coding of the device is provided by identifying information stored in a memory storage device placed on or in a drug delivery device.

17. The method of claim 16, wherein the coding in the memory storage device is read by a reader; and wherein the information is accessible directly and instantaneously from the memory storage device.

18. The method of claim 16, wherein the memory storage device is a RFID device.

19. The method of claim 18, wherein the RFID device is integrated into the device so as not to be accessible to a user.

20. The method of claim 18, wherein the RFID device is passive.

21. A method of identifying and tracking the dispensing of drug delivery devices comprising the steps of:

providing at least one drug delivery device, the drug delivery device having an amount of a drug or other agent for delivery to a user, coding the at least one drug delivery device at effectively the time of manufacture, with a unique code placed on or in the device, wherein the unique code provides unique identifying information;

reading the code with an electronic or optical device; and creating a database and database record comprising the code corresponding to the drug delivery device from which the code was read, in the database, and inputting the identification of the transferee to whom the at least one drug delivery device was transferred upon any transfer of possession of the at least one drug delivery device, into the database record.

22. A method of identifying and tracking the dispensing of transdermal drug delivery devices, comprising the steps of:

providing a plurality of transdermal drug delivery devices, in at least a first package, each device having an amount of a drug or other agent for delivery to a user, each pf the transdermal drug delivery devices having a coding placed on or in the device, wherein the coding provides unique identifying information to each device, providing a coding on the at least first package, the coding providing unique identifying information relating to the first package, creating a database with a plurality of database records corresponding to each transdermal drug delivery device, and corresponding to the at least one first package, wherein upon transfer of the first package, the database records for each of the devices contained therein are updated with at least identifying information relating to the transferee.

* * * * *